United States Patent [19]

Zeitlin

[11] 4,407,521
[45] Oct. 4, 1983

[54] FOLDABLE HAND CART

[76] Inventor: Wolf Zeitlin, 2814 Gregory St., Chicago, Ill. 60625

[21] Appl. No.: 209,666

[22] Filed: Nov. 24, 1980

[51] Int. Cl.³ .............................................. B62B 1/12
[52] U.S. Cl. ..................... 280/655; 280/35; 280/47.37 R; 280/638; 280/651
[58] Field of Search .................. 280/638, 35, DIG. 3, 280/DIG. 4, DIG. 11, 47.13 R, 47.17, 47.18, 47.19, 47.2, 47.24, 47.27, 47.28, 47.29, 47.3 R, 5.24, 651–655

[56] References Cited

U.S. PATENT DOCUMENTS

| | | | |
|---|---|---|---|
| 3,892,429 | 7/1975 | dit Dalmy | 280/651 X |
| 3,998,476 | 12/1976 | Kazmark, Sr. | 280/655 |
| 4,275,894 | 6/1981 | Mortenson | 280/655 X |
| 4,284,287 | 8/1981 | Esposito | 280/655 X |
| 4,286,796 | 9/1981 | Esposito | 280/47.27 |
| 4,290,625 | 9/1981 | Barriere | 280/47.19 X |

FOREIGN PATENT DOCUMENTS 597785 4/1978 Switzerland ............... 280/652

*Primary Examiner*—Joseph F. Peters, Jr.
*Assistant Examiner*—Mitchell J. Hill

[57] ABSTRACT

A foldable hand cart formed with a platform in front and frames extended to form a high back. The cart is collapsible to form a compact assembly bound together by an elastic cord. The platform is automatically locked when unfolded, as are the frames when raised in consecutive order. Simple controls serve to unlock the frames and platform for movements collapsing the cart. Interfitting safeguards reinforce the frames against separating, pivoting and twisting strains.

6 Claims, 9 Drawing Figures

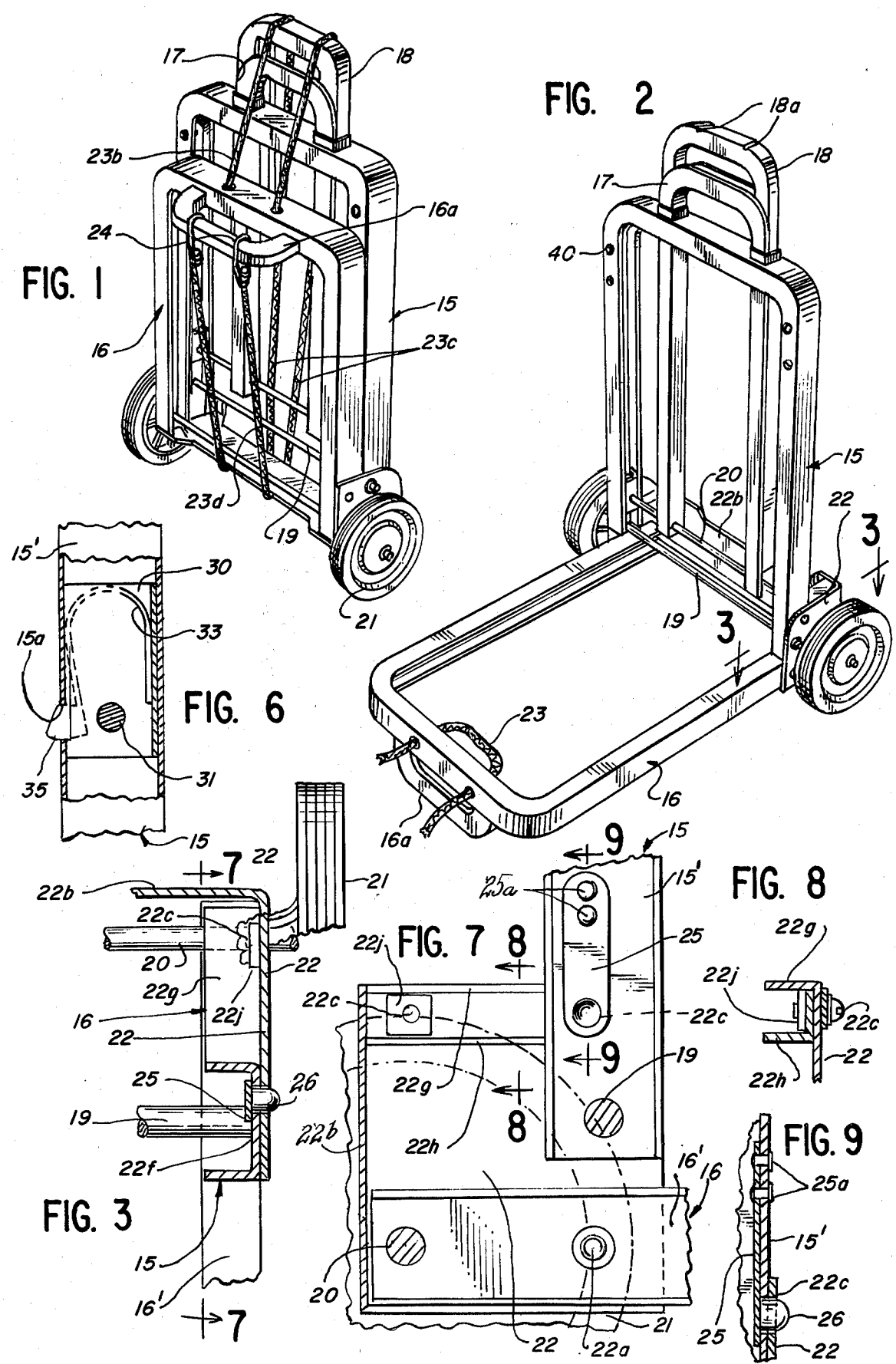

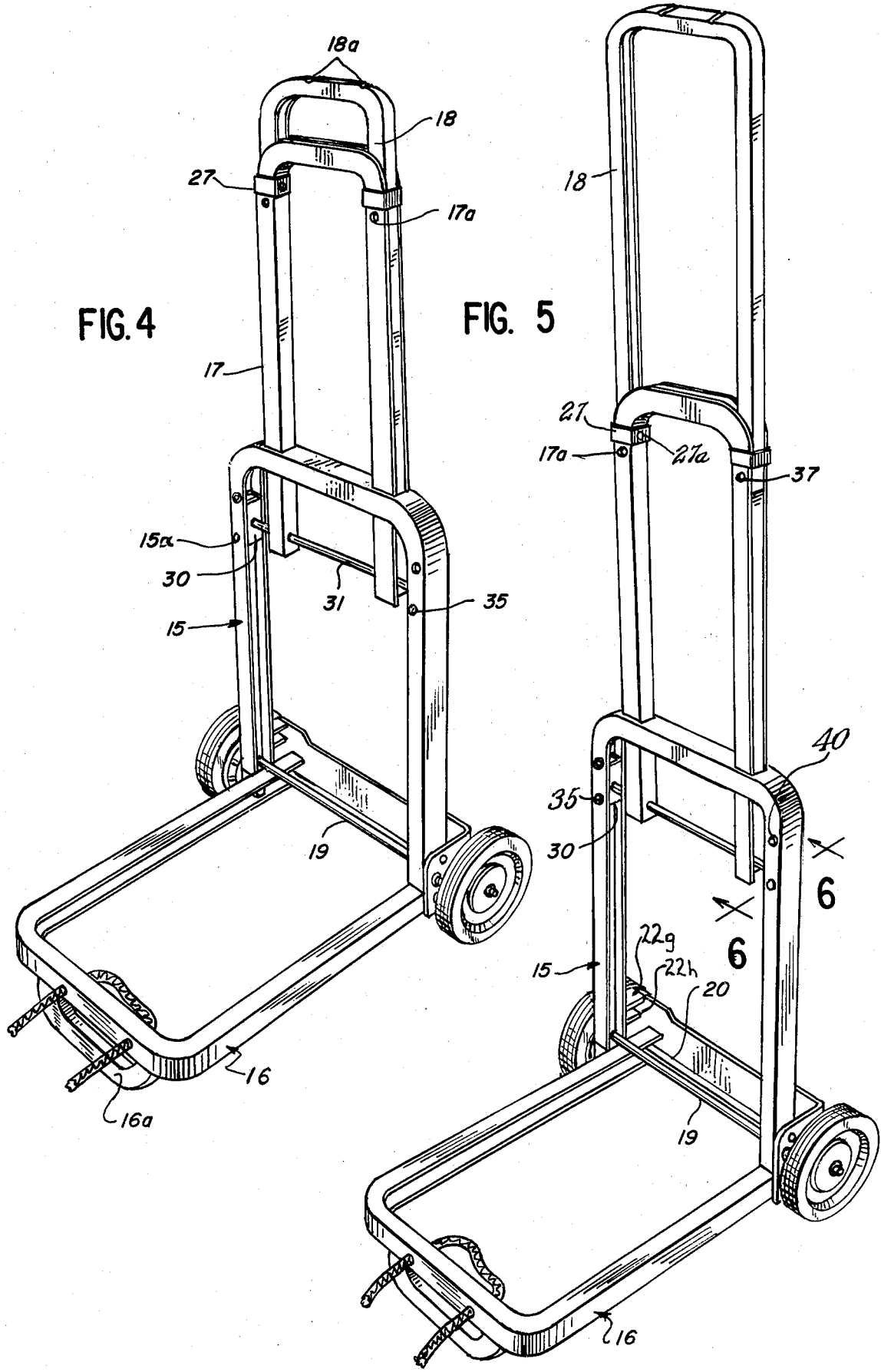

FOLDABLE HAND CART

This invention relates to foldable hand carts used for transporting luggage, heavy packages and the like, and one object of the invention is to provide a cart which is so compact when collapsed that it may be carried in a valise or shopping bag between periods of use.

A further object is to provide a hand cart with sections extensible to form a high back, yet squarely-interfitted and reinforced when extended, to resist pivoting and twisting strains between the sections.

Another object is to provide a hand cart of the type mentioned which has a platform that carries its own wheels for independent and reliable support when traveling with a load of heavy suitcases or the like.

An additional object is to supplement the standing structure of the cart with a platform which applies a backing wall to that structure to resist down-pressure on the platform by heavy loads.

A final object is to combine a binding facility for the cart which maintains it as a compact bundle when collapsed, or with its load securely bound when in use.

A better understanding of the invention may be gained by reference to the accompanying drawings, in which:

FIG. 1 is a perspective view of the cart in the collapsed form;

FIG. 2 is a similar view when the platform of the cart has been swung in forward direction to ground level;

FIG. 3 is an enlarged section on the line 3—3 of FIG. 2;

FIG. 4 is a perspective view of the cart with its back first extended in upward direction;

FIG. 5 is a similar view with the back further extended;

FIG. 6 is an enlarged section of a locking control, taken on the line 6—6 of FIG. 5;

FIG. 7 is a similar section on the line 7—7 of FIG. 3;

FIG. 8 is a similar section on the line 8—8 of FIG. 7; and

FIG. 9 is a section on the line 9—9 of FIG. 8.

Referring specifically to the drawings, the chart is basically composed of a set of four arch-shaped channel frames grouped together when the cart is in collapsed form, as seen in FIG. 1. The main or stationary frame is shown at 15, a platform frame at 16, and front and rear slidable frames at 17 and 18. The side bars 15' of the main frame 15 open inwardly; and the frame is fitted with a rigid cross-shaft 19 at the bottom.

The frames are held together when gathered by an elastic cord 23. Thus, the middle part 23 of the cord seats inside the top of the platform, but becomes visible when the same has been extended as in the bottom of FIG. 2. While the cart is collapsed the middle part 23 of the cord seats as stated when drawn to the left from the position seen in FIG. 2. Then, according to FIG. 1, the cord rises to extend with sections 23b in front of the frame group which seat in grooves 18a made in the top of the rear frame 18 as the cord sections take a rearward downturn. They now extend as companion sections 23c along the back of the frame group to a point under the same, where they take an upturn in front of the shaft 19. The cord then rises with companion sections 23d to terminate with top hooks 24. Finally, when these are drawn upwardly the cord is tensioned to bind the frames of the cart together as the hooks are engaged with a foot-bar 16a extending in forward direction from the top of the platform 16, as seen in FIG. 1. The collapsed cart may now be carried conveniently by inserting the hand under the top of the frontal frame 17. It is also apparent when the cart is collapsed that the slidable frames 17 and 18 will be retained by the binding grip of the cord 23 from sliding out in case the cart should take a fall either in forward or rearward direction.

To set the cart up for use the cord 23 is first unfastened. This is done by pulling off the hooks and unwrapping the cord in reverse direction to extend freely in front of the cart from its initial connection seen at the left-hand end of FIG. 2. This frees the platform frame to be swung down to the level position seen in the same figure.

While the shaft 19 serves as a reinforcement for the sides of the frame 15, it also serves indirectly to pivot the platform frame 16 which carries a shaft 20 at the bottom and extends to carry a pair of ground wheels 21. The frame 16 carries rearward side plates 22 which are attached by rivets 22a and perforated to pivot on the shaft 19 of the main frame 15, as seen in the bottom of FIG. 1; and FIG. 7 shows that the plates 22 are bent forwardly from a back wall 22b which reinforces them. The downswing of the platform is free, but employs a control to fix the platform when it reaches ground level. For this purpose the left-hand side bar 15' of the main frame 15 carries a leaf-spring 25, secured by rivets 25a, which projects a rounded button 26 through an opening 15a in the bar to bear against the related side plate 22 carried by the platform; and such side plate has an opening 22c which arrives opposite the button 26 as the platform reaches ground level. The button then projects through the side plate and forms a stop to keep the platform in the position of use. If desired, the button-type control may be installed on the right-hand side of the cart.

The lowering of the platform as stated constitutes the first step to set the cart up. To continue, the frames 17 and 18 must be raised in consecutive order to upper sliding limits, where they form the usual high back of the cart. Thus, FIG. 4 shows the frame 17 so raised; and FIG. 5 shows that the frame has been raised further to complete the extended back of the cart.

It may be mentioned at this time that the channeled form of all the frames is of square cross-section. Also, while the sides of the frames 15 and 18 open inwardly, those of the frame 17 open outwardly. Further, FIGS. 1 and 2 show that the frames 17 and 18 are squarely interfitted and contained in the frame 15, while the rear frame 18 is slidable in the frontal frame 17; and, as seen in FIG. 1, the slidable frames are originally telescoped in the frame 15. Finally, it is noted in the upper part of FIG. 5 that square bands 27 are attached to the frame 17 by rivets 27a to insure the retention of the sides of the frame 18.

As the frame 17 is raised it is maintained in reinforced alinement with the stationary frame 15 by a pair of channel pieces 30 slidable in the sides of the frame 15, one visible in the center of FIG. 4. The channel pieces receive the ends of a cross-rod 31 which passes through the lower part of the frame 17, as seen in the same figure.

The channel pieces 30 also contain latch devices to lock the frame 17 in raised position. Thus, as clearly shown in FIG. 6, each piece carries a bow spring 33 with a tapered bolt 35 normally bearing against the front of the related upright 15 while the frame 17 is down. However, when the latter is drawn to the top it is stopped by the advance of the bolts 35 through frontal openings 15a in the uprights as seen in FIG. 4, locking the frame 17 in the raised position. Now, as seen in FIG. 5, the frame 18 has similar spring-latch bolts 37 in relation to frontal openings 17a in the uprights of the frame 17. The back of the cart therefore becomes fully extended when the frame 18 has been raised to the locking position.

When the use of the cart is no longer desired it may be collapsed while the user is behind it, becomes of its light weight, by temporarily rotating it toward the user to an inverted position with the head of the frame 18 on the floor. Now the platform may be caused to fold by first pressing the button 26. The user's hands will then be free to press the folded platform evenly toward the frame 15 to bear against the projecting latch bolts 35. This will release the latches, platform and frame 15 to slide down along the frame 17 until the head of the frame 15 meets the extended latch bolts 37. While the fingers are free to depress these, the moved frame assembly will—of its weight—slide to the final position along the frame 18. The rounding of the bolts 35 and 37—of the button 26—are of course the customary way to help these parts recede to the necessary clearance; and the telescoping action of the frames to collapse the cart is also induced as the cart becomes topheavy when inverted to collapse it.

Recalling the latch bolts 35, FIGS. 2 and 4 show that an upper pair of protrusions 40 are formed in the front of the frame 15 some distance above the latch bolts 35. It has been mentioned that the platform closes against the bolts when it is folded. However, when a conventional suitcase—which is usually higher than the bolts 35—is backed on the platform, it will be stopped by the protrusions 40 before it can press the bolts and cause the frame 17 to telescope while the cart is in use.

Important features of the cart will now be pointed out. Thus, the shaft 20 not only connects the side bars 16′ of the platform 16 against spreading, but supports the rear of the platform on the wheels 21. Further, because the platform sides must close with facing contact against those of the frame 15 as seen in FIG. 1, the platform receives the plates 22 on the outside, and is perforated to pivot on the shaft 19 when the platform is raised from the level position of FIGS. 2, 3, and 7. Further, since the frame 15 is pivoted on this shaft it receives backstops in the form of topbends 22g of the side plates 22, as seen in the upper part of FIG. 7; and such topbends are reinforced by liners 22h on the inside, as also seen in FIG. 8. The liners are secured by the bolts 22c from the outer side and nuts 22j on the inner side. Therefore, the backstops apply the strain of a platform load to the upstanding mainframe 15, which is held by the user while the cart is in progress. Secondly, the cord 23 is an essential adjunct of the cart. As mentioned before, it binds the cart components together when the cart is collapsed. However, it also binds the cart expanded by a load even more securely with the cord's tension increased. And thirdly, the cord secures a reliable origin in the head of the platform—as seen in FIG. 2—without the need to tie it or receive additional fastening means. Further, the square form and fit of the major cart components make the cart compact when collasped, and avoid looseness from twisting strains when it is set up. Finally FIGS. 4 and 5 show that the frontal frame extends well below the head of the stationary frame 15, with the cross-rod 30 securing an extended leverage in the sides of that frame to resist back-and-forth pivoting strains between the frames.

I claim:

1. A folding, collapsible hand cart comprising: a load-carrying platform frame having an arch shape with side bars which are attached to a pair of rearward side plates along portions thereof which are forwardly bent from a back wall reinforcing said side plates; a first shaft and wheel assembly passing through said side plates and the ends of said bars to add stability to said platform; said side plates further having a second shaft secured to them above said first shaft and spaced from said back wall and an opening in one of said side plates to receive first locking means positioned on cart handle means, said handle means comprising a main frame carrying extensible, arch-shaped slidable frames, the main frame being of arch shape having side bars which are mounted on said second shaft for pivotal movement of said main frame from a closed position in contact with said platform frame to an open position perpendicular to said platform frame and in locked relationship therewith by the engagement of said first locking means positioned on one of said main frame side bars with said opening in one of said side plates, said extensible frames being located between the side bars of said main frame and slidable through the top of the main frame, said extensible frames being an inner one with lateral channeled uprights opening outwardly, and an outer one with inwardly opening channeled uprights seating in those of the inner frame.

2. The structure of claim 1, said extensible frames being a frontal one first movable and a rear one movable in continuation, and bands carried by the upright sides of the frontal frame extended to retain the upright sides of the rear frame for guiding the same.

3. The structure of claim 2, the main frame having lateral channeled side bars opening inwardly, a cross-rod carried by the lower part of said first-movable extension frame with ends in said side bars and channel pieces carried by such ends and receiving guidance in said side bars, said channel pieces also resisting pivoting between the extensible frames and the main frame.

4. The structure of claim 1, further having a foot-bar spaced in forward direction from the top of the platform frame, such foot-bar spacing the platform from a cart-supporting surface when the platform is in the level position.

5. The structure of claim 1, wherein the stationary frame formed with lateral said side plates are formed with inward top bends, the latter forming backstops behind said main frame when the platform is unfolded to the level position.

6. The structure of claim 3 wherein each channel piece of said frontal frame carries a second locking means to engage an opening in the related side bar of the main frame and each upright of said rear frame carries a third locking means to engage an opening in the related upright of said frontal frame, said main frame further having a protrusion above the opening in said side bar and extending outwardly a distance greater than the protruding second locking means on said frontal frame to prevent luggage resting against said locking means to disengage it from said opening.

* * * * *